Aug. 21, 1934.     S. H. PERKY     1,970,816
DRIVER'S ARMREST
Filed Oct. 19, 1931
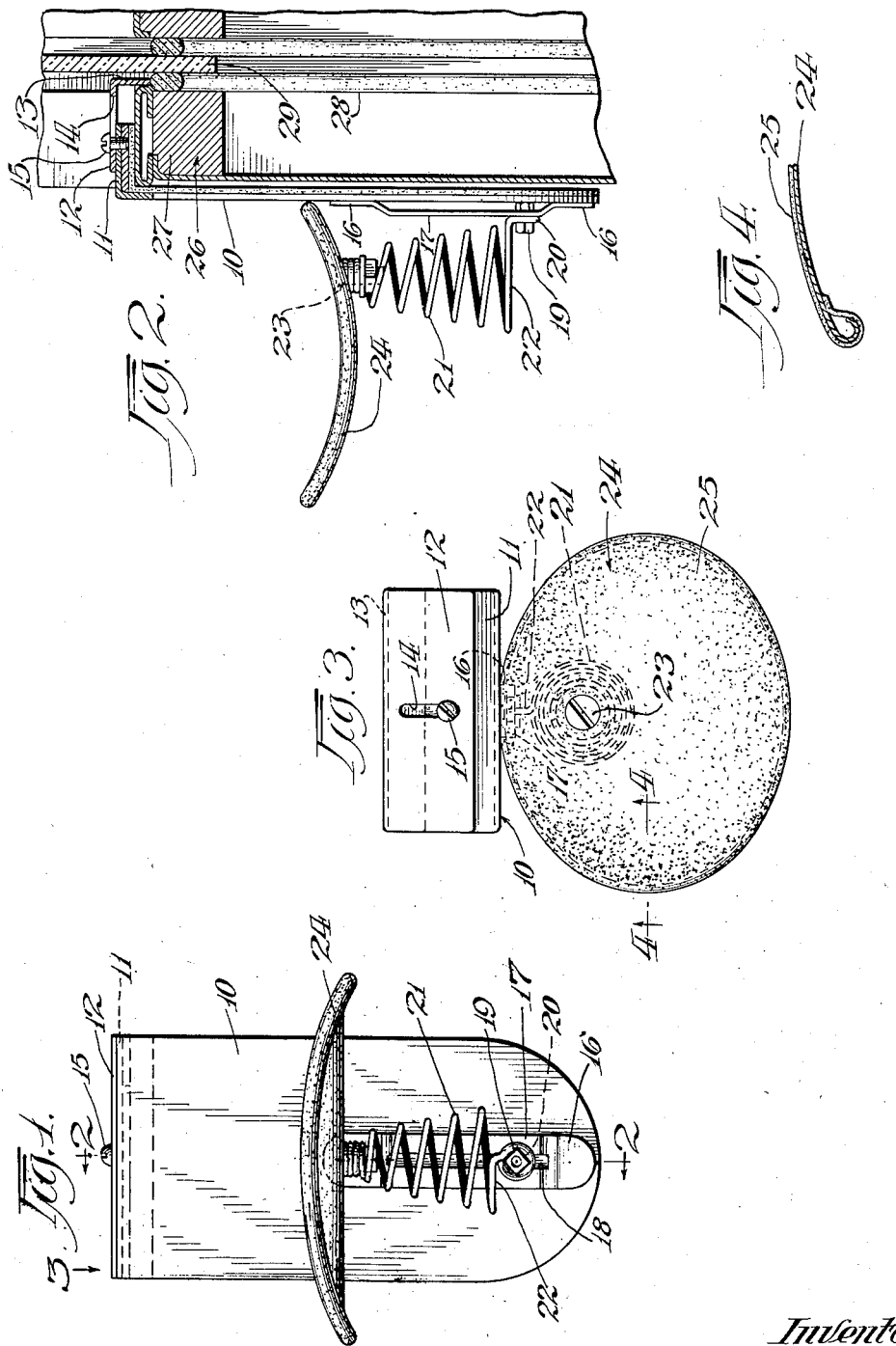

Patented Aug. 21, 1934

1,970,816

UNITED STATES PATENT OFFICE 1,970,816

DRIVER'S ARMREST

Scott H. Perky, Batavia, N. Y.

Application October 19, 1931, Serial No. 569,555

5 Claims. (Cl. 155—198)

My invention relates to an arm rest for the driver of a motor vehicle and more particularly to a device of this type which is characterized by a high degree of comfort, as well as safety in permitting full control of the vehicle's steering wheel.

One object of my invention is to devise an arm rest which is featured by a yielding, resilient support that accommodates itself to a variety of arm positions and provides the required degree of comfort over a wide range of applied arm pressures, so that the rest is characterized by inherent adaptability to meet the conditions presented by different drivers.

A further object is to provide a rest as indicated which is constructed and arranged to permit an automatic disengagement of the arm therefrom when the pressure on the rest is sufficiently increased, a situation which more particularly obtains when the steering wheel is suddenly turned to avoid an obstruction and it is important that the arms be capable of free movement.

A further object is to devise an arm rest which is designed for ready adaptation to the door of a motor vehicle, being adjustable to fit different widths of doors, and which is further susceptible of adjustment to fit different arm elevations, so that the rest is capacitated for being mounted on motor vehicles in general.

In the driving of a motor vehicle, it is customary for the driver, in the interest of comfort, to rest the left arm on the window sill. When occupying such a position, it is obvious that the driver is not most favorably disposed to exert a sudden turn of the steering wheel to the left, as may be necessary in the case of a "blow-out" of a tire, or the avoidance of an obstruction on the road, since the left arm is temporarily incapacitated to exert a full effort on the wheel. Under these conditions, it is necessary for the driver to first remove the left arm to a free moving position, an action which requires both thought and time and a possible distraction of the driver's attention from the primary situation presented. Moreover, the design of any particular vehicle may be such that the relation between the driver's seat and the window sill is not conducive to a comfortable, supporting position of the left arm on the sill and, in any case, such a support is not possible during inclement weather when the window is closed.

In view of the above situation, I have devised the arm rest which forms the subject matter of the present application. Essentially, it comprises a plate upon which the arm rests and which is arranged to provide a yielding, resilient support for the arm, in addition to being adapted for what might be considered a "tipping movement" when subjected to an indicated pressure, such as may arise when the steering wheel is suddenly turned. Under these conditions, the tipping of the rest results in an automatic disengagement of the arm therefrom and its shifting to a place where it is capable of free movement. This relieving movement of the arm does not require any conscious thought, since it is attained merely by pressing downwardly on the support with sufficient pressure. The rest therefore embodies two very desirable characteristics, namely, comfort and safety, and since it is further arranged for attachment to motor cars in general, as well as being adjustable for different arm elevations, the rest is exceedingly versatile in its application.

These and further objects of my invention will be set forth in the following specification, reference being had to the accompanying drawing, and the novel means by which said objects are effectuated will be definitely pointed out in the claims.

In the drawing:

Figure 1 is an elevation of the arm rest, showing the same disengaged from a vehicle door or other supporting structure.

Fig. 2 is a section along the line 2—2 in Fig. 1, looking in the direction of the arrows, and showing the rest mounted upon a vehicle door.

Fig. 3 is a plan view of the rest, looking in the direction of the arrow 3 in Fig. 1.

Fig. 4 is a sectional elevation taken along the line 4—4 in Fig. 3, looking in the direction of the arrows, and showing the construction of the arm plate proper.

Referring to the drawing, the numeral 10 designates a hanger plate which, at its upper end, is provided with a flange 11 located substantially at right angles to the hanger 10. The flange 11 is intended to cooperate with a slide 12 having a downwardly extending flange 13 formed along one side thereof and which also embodies an adjusting slot 14 through which extends an adjusting screw 15 that is threaded in the flange 11. The slide 12 may accordingly be adjusted to place the flange 13 at any desired distance from the hanger 10, within the limitations of the device, so that the latter is arranged to fit different widths of window sills, for example.

As shown in Fig. 2, the flange 11 projects from one side of the hanger 10 and secured to the opposite side is a strap 16 which is offset intermediate its secured ends, as at 17. The offset portion 17 is provided with an adjusting slot 18, in which slides the shank of an adjusting bolt 19. One end 20 of a conical, helical spring 21 is bent around the shank of the bolt 19 outwardly of the offset portion 17 and thereafter extends outwardly from said offset portion, as at 22 in Fig. 2, to form the lowermost coil of the spring 21. The remaining coils of the spring extend upwardly therefrom and the opposite end of the spring is bent around a stud 23 which projects downwardly from an arm plate 24 which may have the generally elliptical contour shown in Fig. 3 and which may be curved transversely, as shown in Fig. 2. The precise shape, or curvature, of the plate 24, however, does not form any part of the present invention. A suitable covering 25 may be placed over the plate 24 and this covering may be of a nature as to conform with the upholstery of the vehicle, or may have such other characteristics as may be desired.

In Fig. 2 is illustrated generally a conventional mounting for the arm rest. According to this arrangement, the slide 12 having first been adjusted to conform to the width of the door 26, the flange 11 will be rested upon the upper side of the sill portion 27 of the door, with the flange 13 extending downwardly into that slot 28 within which the window 29 slides. Downward movement of the rest is accordingly prevented by the flange 11 and the hanger 10 is possessed of sufficient width and length, in conjunction with the flange 13, to prevent any rocking tendency of the hanger plate.

The elevation of the arm plate 24 having been adjusted by means of the bolt 19 to suit the comfort of the particular driver, it will be apparent that said plate affords a yielding, satisfactory support without undue strain to the muscles of the arm. At the same time, the nature of the support for the plate 24 is such that a slight excess pressure will cause a tipping movement of said plate toward the left, as viewed in Fig. 2. This movement is facilitated by the flexible nature of the spring 21, the offset location of the point of attachment of the spring to the strap 16, with reference to the vertical axis of the spring, and also because the attachment of the spring is preferably offset from the center of the plate 24. Disengagement of the driver's arm from the plate 24 will therefore follow instantaneously upon an application of the required pressure, following a sudden twist of the steering wheel, and upon the release of the arm, the plate 24 will resume the position shown in Fig. 2. The device occupies a small space beside the driver and is capable of easy attachment or removal when required.

While I have shown one set of elements and combinations thereof for effectuating my improved rest, it will be understood that the same is intended for purpose of illustration only and in no wise to restrict the device to the exact forms and structures shown, for many changes may be made therein without departing from the spirit of my invention.

I claim:

1. A driver's arm rest for an automotive vehicle which is steered by the driver comprising in combination, an arm plate, a conical, helical spring disposed beneath the plate to provide a flexible and the sole support therefor, the longitudinal axis of the spring being offset from the driver beyond the center of the plate, the smaller end of the spring being rigidly attached to the plate, and means for securing the coil at the larger end of the spring to an adjacent part of the vehicle structure.

2. A driver's arm rest for an automotive vehicle which is steered by the driver comprising in combination, an arm plate, a helical spring disposed beneath the plate to provide a flexible and the sole support therefor, the spring having its longitudinal axis offset from the driver beyond the center of the plate, the upper end of the spring being attached to the plate, and means for attaching the lowermost coil of the spring to an adjacent part of the vehicle structure, the point of attachment of the coil to said means being offset from the longitudinal axis of the spring.

3. A driver's arm rest for an automotive vehicle which is steered by the driver comprising in combination, an arm plate, spring means for flexibly and solely supporting the plate comprising a plurality of superimposed convolutions of spring wire, the end of the uppermost convolution being attached to the plate and the lowermost convolution being located in a plane substantially parallel to the plane including the plate, the end of the lowermost convolution being extended substantially in the plane of the latter and away from the driver and attached to the vehicle structure whereby tipping of the plate is facilitated as pressure is applied thereto.

4. A driver's arm rest for an automotive vehicle which is steered by the driver comprising in combination, an arm plate, a hanger attachable to the vehicle structure, an adjustable bolt mounted on the hanger, and a helical spring located beneath the plate, one end of the spring being secured to the plate and a portion of the coil at the opposite end of the spring being extended and attached to the shank of the bolt.

5. A driver's arm rest for an automotive vehicle which is steered by the driver comprising in combination, an arm plate, a conical, helical spring disposed beneath the plate to provide a support therefor, the small, upper end of the spring being attached to the plate at a point offset from the driver beyond the center of the plate, and means for securing the lowermost coil of the spring to an adjacent part of the vehicle structure, the point of attachment of the spring to said means being offset from the longitudinal axis of the spring.

SCOTT H. PERKY.